UNITED STATES PATENT OFFICE.

WALTER E. WADMAN, OF BAYONNE, NEW JERSEY, ASSIGNOR TO HYGIENIC CHEMICAL COMPANY OF NEW JERSEY, A CORPORATION OF NEW JERSEY.

PROCESS OF PREPARING PURE LITHIUM COMPOUNDS.

No. 876,851.     Specification of Letters Patent.     Patented Jan. 14, 1908.

Application filed October 17, 1906. Serial No. 339,282.

*To all whom it may concern:*

Be it known that I, WALTER E. WADMAN, a subject of the United Kingdom of Great Britain and Ireland, and resident of Bayonne, in the county of Hudson and State of New Jersey, have invented a new and useful Improvement in Process of Preparing Pure Lithium Compounds, of which the following is a specification.

My invention relates to an improvement in process for separating and purifying lithia sulfate.

In the manufacture of lithia salts by treating aluminous or other minerals with sulfuric acid, and particularly such minerals as also contain potash, there is obtained ultimately a solution consisting essentially of a mixture of the sulfates of lithia and potash.

It is well known that in the presence of other alkali sulfates the precipitation of lithia carbonate is very incomplete, owing to the solubility of lithia carbonate in solutions of alkali sulfates. Therefore, if it be attempted to produce lithia carbonate from a solution of mixed lithia and potash sulfate, much of the lithia carbonate remains dissolved in the mother liquors and is either lost or is only recoverable by tedious and expensive methods. In such cases the loss is the greater the more alkaline sulfate there is present and it is therefore very desirable to separate the lithia sulfate as completely as possible from the potash sulfate before precipitating the lithia as carbonate. Such separation cannot be efficiently accomplished by the usual methods of crystallization, owing to the formation of a double sulfate of lithia and potash.

Now I have discovered that it is possible to effect a practically complete separation of sulfate of lithia from sulfate of potash when the same occur together, by taking advantage of the insolubility of sulfate of potash in ammonia and the solubility of sulfate of lithia in the same menstruum. Thus, for example, when, to a solution containing sulfate of potash and sulfate of lithia, ammonia is added, either as a strong aqueous solution, or passed in as a gas, the sulfate of potash is precipitated as a fine crystalline powder, leaving the lithia in solution. The precipitation of sulfate of potash is more or less complete depending on the strength of the solutions and the amount of ammonia added thereto.

If a saturated solution of the mixed sulfates be used and ammonia gas passed in up to the point of saturation, the separation will be practically complete, and by careful manipulation 97% or more of all the potash present can be separated. In order to obtain as complete a separation as possible it is preferable to use ammonia gas, although a partial separation can be effected by aqueous ammonia.

The invention is applicable to all solutions containing sulfate of lithia in admixture with sulfate of potash, whether obtained by direct treatment of lithia ores with sulfuric acid, or by the process of treating the ores with sulfate of potash described and claimed by me in application for Letters Patent of the United States No. 316,231, or to the mother liquors left after precipitating lithia carbonate from lithia sulfate by means of potash carbonate, or to mixed solutions of lithia and potash sulfates howsoever obtained.

To the strong solution of the mixed sulfates I either add a suitable amount of aqueous ammonia, or pass into the solution, ammonia gas, the last method being preferable.

If gas is used the solution must be kept cool by means of a cooling coil, water-jacket or other means to make the absorption of ammonia as complete as possible.

The crystalline precipitate of potash sulfate is easily removable from the ammoniacal solution of lithia sulfate, by filtration or other suitable means, and the ammonia can then be driven off by heat and applied to the treatment of a fresh lot of the mixed solutions.

The solution left after driving off the ammonia is practically a pure solution of lithia sulfate; from which lithia carbonate may be precipitated with a minimum of loss due to the solubility of lithia carbonate in alkaline sulfate solutions.

I claim as my invention:

1. The process of preparing pure lithium compounds from solutions containing a mixture of lithia sulfate and potash sulfate, consisting in adding thereto ammonia in an amount sufficient to render the potash sulfate insoluble, then removing the same from the liquid, then removing the ammonia, and finally precipitating the lithia from the solution in the form of a carbonate.

2. In a process of preparing pure lithium compounds from solutions containing a mixture of lithia sulfate and potash sulfate, the improvement which consists in adding thereto ammonia in an amount sufficient to render the potash sulfate insoluble.

3. In a process of preparing pure lithium compounds from solutions containing a mixture of lithia sulfate and potash sulfate, the improvement which consists in adding thereto ammonia in an amount sufficient to render the potash sulfate insoluble, and subsequently separating it from the solution.

4. In a process of preparing pure lithium compounds from solutions containing a mixture of lithia sulfate and potash sulfate, the improvement which consists in adding thereto ammonia in amounts sufficient to render the potash sulfate insoluble, and precipitating the iron aluminium and manganese in the mixture as hydroxids.

In testimony, that I claim the foregoing as my invention, I have signed my name in presence of two witnesses, this fifteenth day of October, 1906.

WALTER E. WADMAN.

Witnesses:
T. A. SIMONS,
W. O. SMITH.